(12) United States Patent
Sharma et al.

(10) Patent No.: US 7,489,801 B2
(45) Date of Patent: *Feb. 10, 2009

(54) ENCODING AND DECODING SIGNALS FOR DIGITAL WATERMARKING

(75) Inventors: Ravi K. Sharma, Hillsboro, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/383,742

(22) Filed: May 16, 2006

(65) Prior Publication Data

US 2007/0110272 A1 May 17, 2007

Related U.S. Application Data

(63) Continuation of application No. 10/132,060, filed on Apr. 24, 2002, now Pat. No. 7,046,819.

(60) Provisional application No. 60/286,701, filed on Apr. 25, 2001.

(51) Int. Cl.
G06K 9/36 (2006.01)
H04N 7/167 (2006.01)

(52) U.S. Cl. .................. 382/100; 382/235; 380/210

(58) Field of Classification Search .................. 382/100, 382/112, 162, 182, 169–172, 232–235, 237, 382/242, 250, 251, 191, 260, 248, 294, 274, 382/276, 305; 235/468; 713/176; 380/203, 380/210; 348/475; 360/77.08; 375/240.25

See application file for complete search history.

(56) References Cited

U.S. PATENT DOCUMENTS

| 3,810,156 A | 5/1974 | Goldman |
| 3,919,479 A | 11/1975 | Moon et al. |
| 4,071,698 A | 1/1978 | Barger, Jr. et al. |
| 4,230,990 A | 10/1980 | Lert, Jr. et al. |
| 4,284,846 A | 8/1981 | Marley |
| 4,432,096 A | 2/1984 | Bunge |
| 4,450,531 A | 5/1984 | Kenyon et al. |
| 4,495,526 A | 1/1985 | Baranoff-Rossine |
| 4,499,601 A | 2/1985 | Matthews |

(Continued)

FOREIGN PATENT DOCUMENTS

EP 161512 11/1985

(Continued)

OTHER PUBLICATIONS

U.S. Appl. No. 09/343,104, filed Jun. 29, 1999, Rodriguez et al.

(Continued)

*Primary Examiner*—Seyed Azarian

(57) ABSTRACT

This disclosure describes methods and systems for encoding a digital watermark into and/or detecting a digital watermark from a host (or media) signal such as audio, video or imagery. One implementation involves a method of detecting a digital watermark. The method includes: receiving a host signal carrying a digital watermark; computing attributes of the host signal; using the attributes of the host signal to compute a key; and using the key to detect the digital watermark in a transform domain dependent on the key. Other methods, systems and apparatus are provided as well.

16 Claims, 2 Drawing Sheets

U.S. PATENT DOCUMENTS

| | | | |
|---|---|---|---|
| 4,511,917 A | 4/1985 | Kohler et al. | |
| 4,547,804 A | 10/1985 | Greenberg | |
| 4,634,966 A | 1/1987 | Nakatani et al. | |
| 4,639,779 A | 1/1987 | Greenberg | |
| 4,677,466 A | 6/1987 | Lert, Jr. et al. | |
| 4,682,370 A | 7/1987 | Matthews | |
| 4,697,209 A | 9/1987 | Kiewit et al. | |
| 4,739,398 A | 4/1988 | Thomas et al. | |
| 4,776,017 A | 10/1988 | Fujimoto | |
| 4,805,020 A | 2/1989 | Greenberg | |
| 4,807,031 A | 2/1989 | Broughton et al. | |
| 4,843,562 A | 6/1989 | Kenyon et al. | |
| 4,858,000 A | 8/1989 | Lu | |
| 4,888,798 A | 12/1989 | Earnest | |
| 4,918,730 A | 4/1990 | Schulze | |
| 4,931,871 A | 6/1990 | Kramer | |
| 4,945,412 A | 7/1990 | Kramer | |
| 4,967,273 A | 10/1990 | Greenberg | |
| 4,972,471 A | 11/1990 | Gross | |
| 5,019,899 A | 5/1991 | Boles et al. | |
| 5,023,907 A | 6/1991 | Johnson et al. | |
| 5,023,929 A | 6/1991 | Call | |
| 5,031,228 A | 7/1991 | Lu | |
| 5,134,719 A | 7/1992 | Mankovitz | |
| 5,200,822 A | 4/1993 | Bronfin et al. | |
| 5,210,820 A | 5/1993 | Kenyon | |
| 5,214,792 A | 5/1993 | Alwadish | |
| 5,251,301 A | 10/1993 | Cook | |
| 5,276,629 A | 1/1994 | Reynolds | |
| 5,303,393 A | 4/1994 | Noreen et al. | |
| 5,319,453 A | 6/1994 | Copriviza et al. | |
| 5,371,551 A | 12/1994 | Logan et al. | |
| 5,400,261 A | 3/1995 | Reynolds | |
| 5,410,598 A | 4/1995 | Shear | |
| 5,436,653 A | 7/1995 | Ellis | |
| 5,437,050 A | 7/1995 | Lamb et al. | |
| 5,481,294 A | 1/1996 | Thomas et al. | |
| 5,486,686 A | 1/1996 | Zdybel, Jr. et al. | |
| 5,491,838 A | 2/1996 | Takahisa et al. | |
| 5,504,518 A | 4/1996 | Ellis et al. | |
| 5,539,635 A | 7/1996 | Larson, Jr. | |
| 5,564,073 A | 10/1996 | Takahisa | |
| 5,572,246 A | 11/1996 | Ellis et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,577,249 A | 11/1996 | Califano | |
| 5,577,266 A | 11/1996 | Takahisa et al. | |
| 5,579,124 A | 11/1996 | Aijala et al. | |
| 5,579,537 A | 11/1996 | Takahisa | |
| 5,581,658 A | 12/1996 | O'Hagan et al. | |
| 5,581,800 A | 12/1996 | Fardeau et al. | |
| 5,584,070 A | 12/1996 | Harris et al. | |
| 5,612,729 A | 3/1997 | Ellis et al. | |
| 5,621,454 A | 4/1997 | Ellis et al. | |
| 5,629,980 A | 5/1997 | Stefik et al. | |
| 5,640,193 A | 6/1997 | Wellner | |
| 5,661,787 A | 8/1997 | Pocock | |
| 5,663,766 A | 9/1997 | Sizer, II | |
| 5,671,267 A | 9/1997 | August et al. | |
| 5,708,478 A | 1/1998 | Tognazzini | |
| 5,721,827 A | 2/1998 | Logan et al. | |
| 5,732,216 A | 3/1998 | Logan et al. | |
| 5,737,025 A | 4/1998 | Dougherty et al. | |
| 5,740,244 A | 4/1998 | Indeck | |
| 5,751,854 A | 5/1998 | Saitoh et al. | |
| 5,761,606 A | 6/1998 | Wolzien | |
| 5,765,152 A | 6/1998 | Erickson | |
| 5,765,176 A | 6/1998 | Bloomberg | |
| 5,774,452 A | 6/1998 | Wolosewicz | |
| 5,774,664 A | 6/1998 | Hidary et al. | |
| 5,778,192 A | 7/1998 | Shuster et al. | |
| 5,781,914 A | 7/1998 | Stork et al. | |
| 5,806,031 A | 9/1998 | Fineberg | |
| 5,815,709 A | 9/1998 | Waldo et al. | |
| 5,822,436 A * | 10/1998 | Rhoads | 380/54 |
| 5,832,119 A | 11/1998 | Rhoads | |
| 5,841,978 A | 11/1998 | Rhoads | |
| 5,842,162 A | 11/1998 | Fineberg | |
| 5,845,281 A | 12/1998 | Benson et al. | |
| 5,862,260 A | 1/1999 | Rhoads | |
| 5,875,249 A | 2/1999 | Mintzer et al. | |
| 5,889,868 A | 3/1999 | Moskowitz et al. | |
| 5,892,536 A | 4/1999 | Logan et al. | |
| 5,892,900 A | 4/1999 | Ginter et al. | |
| 5,893,095 A | 4/1999 | Jain et al. | |
| 5,901,224 A | 5/1999 | Hecht | |
| 5,902,353 A | 5/1999 | Reber et al. | |
| 5,903,892 A | 5/1999 | Hoffert et al. | |
| 5,905,248 A | 5/1999 | Russell et al. | |
| 5,905,800 A | 5/1999 | Moskowitz et al. | |
| 5,915,019 A | 6/1999 | Ginter et al. | |
| 5,915,027 A | 6/1999 | Cox et al. | |
| 5,918,223 A | 6/1999 | Blum et al. | |
| 5,930,369 A | 7/1999 | Cox et al. | |
| 5,932,863 A | 8/1999 | Rathus | |
| 5,937,000 A | 8/1999 | Lee et al. | |
| 5,938,727 A | 8/1999 | Ikeda | |
| 5,940,135 A | 8/1999 | Petrovic | |
| 5,943,422 A | 8/1999 | Van Wie et al. | |
| 5,945,932 A | 8/1999 | Smith | |
| 5,974,548 A | 10/1999 | Adams | |
| 5,978,791 A | 11/1999 | Farber et al. | |
| 5,982,956 A | 11/1999 | Lahmi | |
| 5,983,176 A | 11/1999 | Hoffert et al. | |
| 5,986,651 A | 11/1999 | Reber et al. | |
| 5,986,692 A | 11/1999 | Logan et al. | |
| 5,987,509 A | 11/1999 | Portuesi | |
| 5,988,897 A | 11/1999 | Pierce et al. | |
| 5,991,500 A | 11/1999 | Kanota et al. | |
| 5,991,737 A | 11/1999 | Chen | |
| 5,991,876 A | 11/1999 | Johnson et al. | |
| 5,995,105 A | 11/1999 | Reber et al. | |
| 5,999,224 A | 12/1999 | Maeda et al. | |
| 6,002,443 A | 12/1999 | Iggulden | |
| 6,021,432 A | 2/2000 | Sizer, II et al. | |
| 6,028,960 A | 2/2000 | Graf et al. | |
| 6,058,430 A | 5/2000 | Kaplan | |
| 6,061,719 A | 5/2000 | Bendinelli et al. | |
| 6,075,568 A | 6/2000 | Matsuura | |
| 6,076,734 A | 6/2000 | Dougherty et al. | |
| 6,081,629 A | 6/2000 | Browning | |
| 6,081,827 A | 6/2000 | Reber et al. | |
| 6,081,830 A | 6/2000 | Schindler | |
| 6,084,528 A | 7/2000 | Beach et al. | |
| 6,088,455 A | 7/2000 | Logan et al. | |
| 6,098,106 A | 8/2000 | Philyaw et al. | |
| 6,121,530 A | 9/2000 | Sonoda | |
| 6,122,403 A * | 9/2000 | Rhoads | 382/233 |
| 6,138,151 A | 10/2000 | Reber et al. | |
| 6,157,721 A | 12/2000 | Shear et al. | |
| 6,164,534 A | 12/2000 | Rathus et al. | |
| 6,169,541 B1 | 1/2001 | Smith | |
| 6,181,817 B1 | 1/2001 | Zabih | |
| 6,182,018 B1 | 1/2001 | Tran et al. | |
| 6,185,316 B1 | 2/2001 | Buffam | |
| 6,185,683 B1 | 2/2001 | Ginter et al. | |
| 6,199,048 B1 | 3/2001 | Hudetz et al. | |
| 6,199,076 B1 | 3/2001 | Logan et al. | |
| 6,201,879 B1 | 3/2001 | Bender et al. | |
| 6,219,787 B1 | 4/2001 | Brewer | |
| 6,278,781 B1 | 8/2001 | Rhoads | |
| 6,282,362 B1 | 8/2001 | Murphy et al. | |
| 6,286,036 B1 | 9/2001 | Rhoads | |

| | | |
|---|---|---|
| 6,304,523 B1 | 10/2001 | Jones et al. |
| 6,311,214 B1 | 10/2001 | Rhoads |
| 6,314,457 B1 | 11/2001 | Schena et al. |
| 6,317,881 B1 | 11/2001 | Shah-Nazaroff et al. |
| 6,321,992 B1 | 11/2001 | Knowles et al. |
| 6,324,573 B1 | 11/2001 | Rhoads |
| 6,345,104 B1 | 2/2002 | Rhoads |
| 6,386,453 B1 | 5/2002 | Russell et al. |
| 6,389,055 B1 | 5/2002 | August et al. |
| 6,400,826 B1 * | 6/2002 | Chen et al. ............... 382/100 |
| 6,408,331 B1 | 6/2002 | Rhoads |
| 6,411,725 B1 | 6/2002 | Rhoads |
| 6,415,280 B1 | 7/2002 | Farber et al. |
| 6,425,081 B1 | 7/2002 | Iwamura |
| 6,433,946 B2 | 8/2002 | Ogino |
| 6,434,561 B1 | 8/2002 | Durst, Jr. et al. |
| 6,439,465 B1 | 8/2002 | Bloomberg |
| 6,449,367 B2 | 9/2002 | Van Wie et al. |
| 6,466,670 B1 | 10/2002 | Tsuria et al. |
| 6,483,927 B2 * | 11/2002 | Brunk et al. ............... 382/100 |
| 6,496,802 B1 | 12/2002 | van Zoest et al. |
| 6,505,160 B1 | 1/2003 | Levy et al. |
| 6,512,837 B1 * | 1/2003 | Ahmed ............... 382/100 |
| 6,522,769 B1 | 2/2003 | Rhoads et al. |
| 6,523,175 B1 | 2/2003 | Chan |
| 6,526,449 B1 | 2/2003 | Philyaw et al. |
| 6,542,927 B2 | 4/2003 | Rhoads |
| 6,542,933 B1 | 4/2003 | Durst, Jr. et al. |
| 6,546,418 B2 | 4/2003 | Ritz et al. |
| 6,553,129 B1 | 4/2003 | Rhoads |
| 6,574,594 B2 | 6/2003 | Pitman et al. |
| 6,577,746 B1 | 6/2003 | Evans et al. |
| 6,614,914 B1 | 9/2003 | Rhoads |
| 6,657,117 B2 | 12/2003 | Weare et al. |
| 6,658,568 B1 | 12/2003 | Ginter et al. |
| 6,674,876 B1 | 1/2004 | Hannigan et al. |
| 6,674,993 B1 | 1/2004 | Tarbouriech |
| 6,681,028 B2 | 1/2004 | Rodriguez et al. |
| 6,683,966 B1 * | 1/2004 | Tian et al. ............... 382/100 |
| 6,697,948 B1 | 2/2004 | Rabin et al. |
| 6,748,360 B2 | 6/2004 | Pitman et al. |
| 6,748,533 B1 | 6/2004 | Wu |
| 6,753,883 B2 | 6/2004 | Schena et al. |
| 6,768,980 B1 | 7/2004 | Meyer et al. |
| 6,771,885 B1 | 8/2004 | Agnihotri |
| 6,772,124 B2 | 8/2004 | Hoffberg et al. |
| 6,775,392 B1 * | 8/2004 | Rhoads ............... 382/100 |
| 6,807,534 B1 | 10/2004 | Erickson |
| 6,813,369 B2 | 11/2004 | Oki |
| 6,829,368 B2 | 12/2004 | Meyer et al. |
| 6,834,308 B1 | 12/2004 | Ikezoye |
| 6,850,252 B1 | 2/2005 | Hofberg |
| 6,856,977 B1 | 2/2005 | Adelsbach |
| 6,880,082 B2 | 4/2005 | Ohta |
| 6,925,342 B2 | 8/2005 | Hars |
| 6,931,451 B1 | 8/2005 | Logan et al. |
| 6,934,114 B1 * | 8/2005 | Codilian et al. ......... 360/77.08 |
| 6,941,275 B1 | 9/2005 | Swierczek |
| 6,948,068 B2 | 9/2005 | Lawandy et al. |
| 6,954,540 B2 | 10/2005 | Maeno |
| 6,965,682 B1 | 11/2005 | Davis et al. |
| 6,968,337 B2 | 11/2005 | Wold |
| 6,970,886 B1 | 11/2005 | Conwell et al. |
| 6,973,574 B2 | 12/2005 | Mihcak et al. |
| 6,973,669 B2 | 12/2005 | Daniels |
| 6,987,862 B2 | 1/2006 | Rhoads |
| 6,990,453 B2 | 1/2006 | Wang |
| 7,035,867 B2 | 4/2006 | Thompson et al. |
| 7,047,406 B2 | 5/2006 | Schleicher et al. |
| 7,047,413 B2 | 5/2006 | Yacobi et al. |
| 7,050,603 B2 | 5/2006 | Rhoads et al. |
| 7,058,223 B2 | 6/2006 | Cox |
| 7,058,697 B2 | 6/2006 | Rhoads |
| 7,085,613 B2 | 8/2006 | Pitman et al. |
| 7,099,495 B2 | 8/2006 | Kondo et al. |
| 7,116,717 B1 * | 10/2006 | Eshet et al. ............ 375/240.25 |
| 7,127,744 B2 | 10/2006 | Levy |
| 7,159,121 B2 | 1/2007 | Takaragi |
| 7,162,642 B2 | 1/2007 | Schumann et al. |
| 7,174,293 B2 | 2/2007 | Kenyon et al. |
| 7,185,201 B2 | 2/2007 | Rhoads |
| 7,206,820 B1 | 4/2007 | Rhoads et al. |
| 2001/0011233 A1 | 8/2001 | Narayanaswami |
| 2001/0032312 A1 | 10/2001 | Runje et al. |
| 2001/0044824 A1 | 11/2001 | Hunter et al. |
| 2001/0051915 A1 | 12/2001 | Ueno et al. |
| 2001/0055391 A1 | 12/2001 | Jacobs |
| 2002/0010826 A1 | 1/2002 | Takahashi et al. |
| 2002/0028000 A1 | 3/2002 | Conwell et al. |
| 2002/0040433 A1 | 4/2002 | Kondo |
| 2002/0048224 A1 | 4/2002 | Dygert |
| 2002/0052885 A1 | 5/2002 | Levy |
| 2002/0059208 A1 | 5/2002 | Abe |
| 2002/0069107 A1 | 6/2002 | Werner |
| 2002/0072982 A1 | 6/2002 | Van de Sluis |
| 2002/0072989 A1 | 6/2002 | Van de Sluis |
| 2002/0083123 A1 | 6/2002 | Freedman et al. |
| 2002/0087885 A1 | 7/2002 | Peled |
| 2002/0088336 A1 | 7/2002 | Stahl |
| 2002/0102966 A1 | 8/2002 | Lev et al. |
| 2002/0126872 A1 | 9/2002 | Brunk et al. |
| 2002/0133499 A1 | 9/2002 | Ward et al. |
| 2002/0150165 A1 | 10/2002 | Huizer |
| 2002/0152388 A1 | 10/2002 | Linnartz et al. |
| 2002/0153661 A1 | 10/2002 | Brooks et al. |
| 2002/0161741 A1 | 10/2002 | Wang et al. |
| 2002/0168082 A1 | 11/2002 | Razdan |
| 2002/0174431 A1 | 11/2002 | Bowman et al. |
| 2002/0178410 A1 | 11/2002 | Haitsma et al. |
| 2003/0018709 A1 | 1/2003 | Schrempp et al. |
| 2003/0028796 A1 | 2/2003 | Roberts et al. |
| 2003/0037010 A1 | 2/2003 | Schmelzer |
| 2003/0051252 A1 | 3/2003 | Miyaoku |
| 2003/0120679 A1 | 6/2003 | Kriechbaum et al. |
| 2003/0135623 A1 | 7/2003 | Schrempp et al. |
| 2003/0167173 A1 | 9/2003 | Levy et al. |
| 2003/0174861 A1 | 9/2003 | Levy et al. |
| 2003/0197054 A1 | 10/2003 | Eunson |
| 2004/0049540 A1 | 3/2004 | Wood |
| 2004/0145661 A1 | 7/2004 | Murakami et al. |
| 2004/0169892 A1 | 9/2004 | Yoda |
| 2004/0201676 A1 | 10/2004 | Needham |
| 2004/0223626 A1 | 11/2004 | Honsinger et al. |
| 2005/0043018 A1 | 2/2005 | Kawamoto |
| 2005/0058319 A1 | 3/2005 | Rhoads et al. |
| 2005/0108242 A1 | 5/2005 | Kalker et al. |
| 2005/0144455 A1 | 6/2005 | Haitsma |
| 2005/0229107 A1 | 10/2005 | Hull et al. |
| 2005/0267817 A1 | 12/2005 | Barton et al. |
| 2007/0031000 A1 | 2/2007 | Rhoads et al. |

FOREIGN PATENT DOCUMENTS

| | | |
|---|---|---|
| EP | 464328 | 1/1992 |
| EP | 493091 | 7/1992 |
| EP | 581317 | 2/1994 |
| EP | 649074 | 4/1995 |
| EP | 901282 | 3/1999 |
| EP | 953938 | 11/1999 |
| EP | 0967803 | 12/1999 |
| EP | 1173001 | 1/2002 |
| EP | 1199878 | 4/2002 |
| JP | 11265396 | 9/1999 |
| JP | 11272287 | 10/1999 |
| WO | WO94/00842 | 1/1994 |
| WO | WO97/33273 | 9/1997 |

| | | |
|---|---|---|
| WO | WO97/41683 | 11/1997 |
| WO | WO97/43736 | 11/1997 |
| WO | WO98/03923 | 1/1998 |
| WO | WO98/20675 | 5/1998 |
| WO | WO98/36372 | 8/1998 |
| WO | WO98/43237 | 10/1998 |
| WO | WO99/18723 | 4/1999 |
| WO | WO99/35809 | 7/1999 |
| WO | WO99/41900 | 8/1999 |
| WO | WO99/48099 | 9/1999 |
| WO | WO99/57623 | 11/1999 |
| WO | WO00/58940 | 10/2000 |
| WO | WO00/70585 | 11/2000 |
| WO | WO00/79709 | 12/2000 |
| WO | WO 01/01331 | 1/2001 |
| WO | WO01/15021 | 3/2001 |
| WO | WO01/20483 | 3/2001 |
| WO | WO01/20609 | 3/2001 |
| WO | WO01/35676 | 5/2001 |
| WO | WO01/62004 | 8/2001 |
| WO | WO01/71517 | 9/2001 |
| WO | WO0172030 | 9/2001 |
| WO | WO01/75629 | 10/2001 |
| WO | WO0175794 | 10/2001 |
| WO | WO02/11123 | 2/2002 |
| WO | WO0219589 | 3/2002 |
| WO | WO02/27600 | 4/2002 |
| WO | WO02082271 | 10/2002 |

OTHER PUBLICATIONS

U.S. Appl. No. 09/420,945, filed Oct. 19, 1999, Kenyon et al.
U.S. Appl. No. 09/476,686, filed Dec. 30, 1999, Rhoads et al.
U.S. Appl. No. 09/511,632, filed Feb. 11, 2000, Ikezoye et al.
U.S. Appl. No. 09/531,076, filed Mar. 18, 2000, Rhoads et al.
U.S. Appl. No. 09/574,726, filed May 18, 2000, Rhoads et al.
U.S. Appl. No. 60/134,782, filed May 19, 1999, Rhoads.
U.S. Appl. No. 60/155/064, filed Sep. 21, 1999, Kenyon.
U.S. Appl. No. 60/175,159, filed Jan. 7, 2000, Derose et al.
U.S. Appl. No. 60/178,028, filed Jan. 26, 2000, Meyer et al.
U.S. Appl. No. 60/191,778, filed Mar. 24, 2000, Ramos.
U.S. Appl. No. 60/218,824, filed Jul. 18, 2000, Kenyon et al.
U.S. Appl. No. 60/232,618, filed Sep. 14, 2000, Cox.
U.S. Appl. No. 60/257,822, filed Dec. 21, 2000, Aggson et al.
U.S. Appl. No. 60/263,490, Jan. 22, 2001, Brunk et al.
May 18, 2007 Notice of Allowance; Apr. 17, 2007 Amendment Accompanying Request for Continued Examination, and Oct. 20, 2006 Office Action, all from U.S. Appl. No. 10/027,783, Brunk et al., filed Dec. 19, 2001 (published as 2002-0126872 A1).
Feb. 22, 2007 Amendment and Sep. 22, 2006 Office Action, each from assignee's U.S. Appl. No. 10/338,031 (published as US 2003-0174861 A1).
Aust, D., "Augmenting Paper Documents with Digital Information in a Mobile Environment," MS Thesis, University of Dortmund, Department of Computer Graphics, Sep. 3, 1996.
Arai et al, "Retrieving Electronic Documents with Real-World Objects on InteractiveDESK," UIST '95, Nov. 14, 1995.
Arai, InteractiveDESK: A Computer-Augmented Desk Which Responds to Operations on Real Objects, CHI 95, May 7, 1995.
Depovere, et al., "The VIVA Project: Digital Watermarking for Broadcast Monitoring," 1999 IEEE, pp. 202-205.
Ghias et al, Query by Humming: Musical Information Retrieval In An Audio Database. In ACM Multimedia, pp. 231-236, Nov. 1995.
Kageyama et al, Melody Retrieval with Humming, Proceedings of Int. Computer Music Conference (ICMC), 1993.
Kim, W.G et al., "A watermarking Scheme for Both Spatial and Frequency Domain to Extract te Seal Image Without the Original Image," Proc. $5.^{th}$ Int. Symp. on Signal Processing and its Applications, Aug. 1999, pp. 293-296.
Lin, et al., "Generating Robust Digital Signature for Image/Video Authentication," Proc. Multimedia and Security workshop at ACM Multimedia '98, Sep. 1, 1998, pp. 49-54.
Lu et al., "Highly Robust Image Watermaking Using Complementary Modulations," Proc. $2.^{nd}$ Information Security Workshop, LNCS vol. 1729, Nov. 1999, pp. 136-153.
Mintzer et al., "If One Watermark is Good, Are More Better?," Proc. IEEE Int. Conf. on Acoustics, Speech and Signal Processing, Mar. 1999. pp. 2067-2069.
Muscle Fish press release, Muscle Fish's Audio Search Technology to be Encapsulated into Informix Datablade Module, Jul. 10, 1996.
Ohbuchi et al., "A Shape-Preserving Data Embedding Algorithm for NURBS Curves and Surfaces," Proc. Computer Graphics International (CGI '99), Jun. 1999, pp. 180-187.
Onishi et al., "A Method of Watermaking with Multiresolution Analysis and Pseudo Noise Sequences," Systems and Computers in Japan, vol. 29, No. 5, May 1998, pp. 11-19.
Voyatzis et al., "The Use of Watermarks in the Protection of Digital Multimedia Products," Proc. of the IEEE, vol. 87, No. 7, Jul. 1999, pp. 1197-1207.
Wold et al, Content-Based Classification, Search, and Retrieval of Audio, IEEE Multimedia Magazine, Fall, 1996.
Worring, "Hyperdocument Generation Using OCR and Icon Detection," Proc. 3d Int. Conf. on Doc. Analysis and Recognition, Aug. 14, 1995.
Yi et al., "Agent-Based Copyright Protection Architecture for Online Electronic Publishing," Proc. SPIE vol. 3657: Security and Watermarking of Multimedia Contents, Jan. 1999, pp. 484-493.
Zhao, "A WWW Service to Embed and Prove Digital Copyright Watermarks," Proc. of the Euro. Conf. on Multimedia Applications, Services and Techniques, May 1996, 15 pages.
Preliminary Amendment filed Oct. 1, 2007 in assignee's U.S. Appl. No. 11/544,990 (published as US 2007-0031000 A1).
Suggested Restriction Requirement filed Oct. 1, 2007 in assignee's U.S. Appl. No. 11/544,990 (published as US 2007-0031000 A1).
U.S. Appl. No. 11/738,973 (including specification, drawings and claims), filed Apr. 23, 2007.

* cited by examiner

ENCODING AND DECODING SIGNALS FOR DIGITAL WATERMARKING

The present application is a continuation of application Ser. No. 10/132,060, filed Apr. 24, 2002 (now U.S. Pat. No. 7,046,819) which claims benefit of provisional application No. 60/286,701, filed Apr. 25, 2001, which are each hereby incorporated by reference.

TECHNICAL FIELD

Background

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. Nos. 09/503,881 (now U.S. Pat. No. 6,614,914), 60/278,049 and U.S. Pat. No. 6,122,403, which are hereby incorporated by reference.

DETAILED DESCRIPTION

This disclosure describes a method for encoding a digital watermark into an image signal that is robust to geometric distortion. The digital watermark is adapted to the host image signal in which it is embedded so as to be imperceptible or substantially imperceptible in the watermarked image when displayed or printed. This digital watermark may be used to determine the geometric distortion applied to a watermarked image, may be used to carry auxiliary information, and may be used to detect and decode a digital watermark embedded in a geometrically distorted version of a watermarked image. Because of its robustness to geometric distortion, the digital watermark is useful for a number of applications for embedding auxiliary data in image signals, including still pictures and video, where the image signal is expected to survive geometric distortion.

This method may be adapted to other types of media signals such as audio.

The digital watermarking system includes an embedder and a detector. The embedder embeds the digital watermark into a host media signal so that it is substantially imperceptible. The detector reads the watermark from a watermarked signal.

Figure 1:
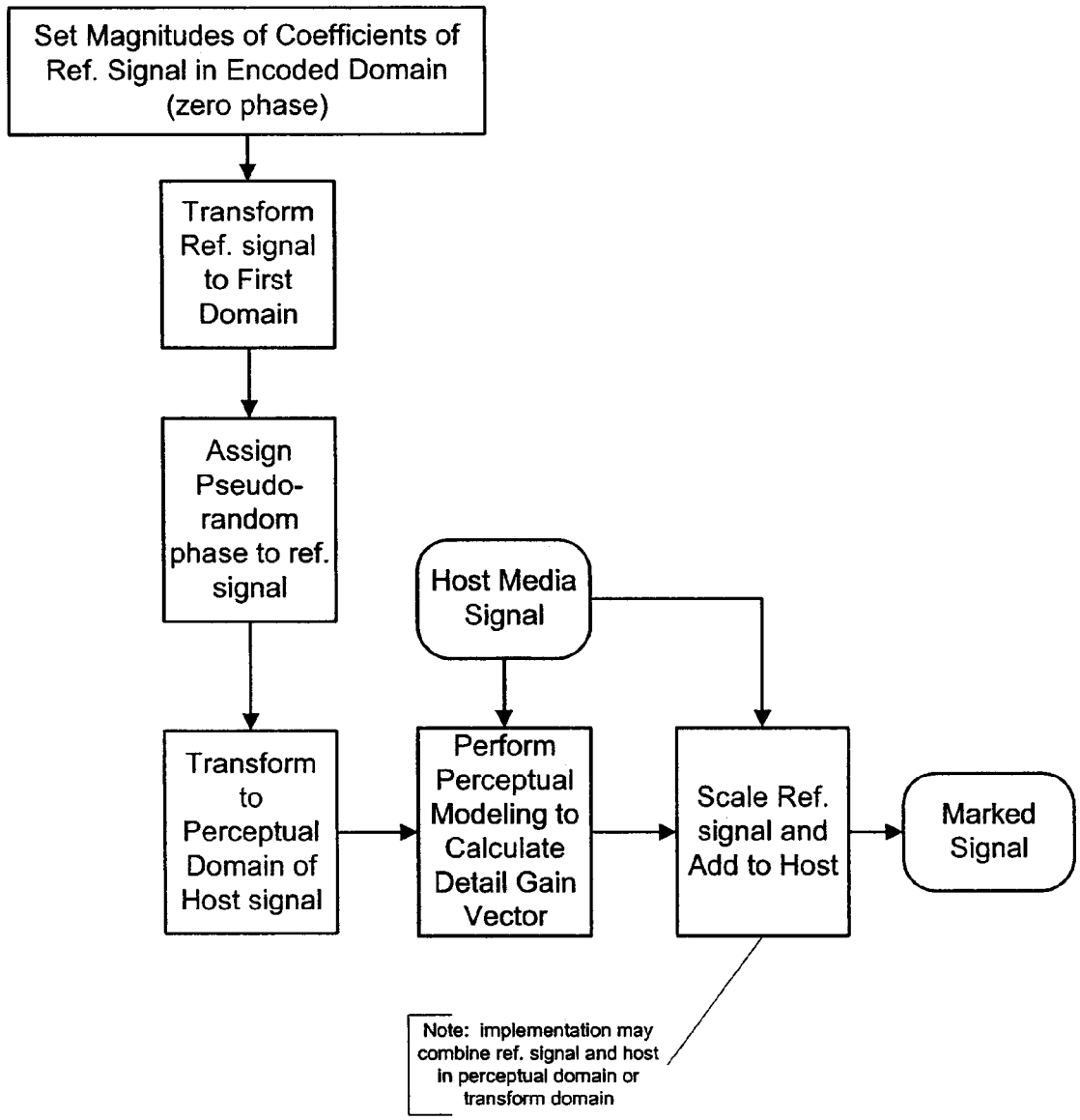
FIG. 1 is a diagram illustrating a digital watermark embedder.

FIG. 1 is a diagram illustrating a digital watermark embedder.

The embedder encodes a reference signal into a particular transform domain of the host media signal, called the encoded domain. The embedding of the reference signal may use a secret key. Also, the encoded reference signal can be embedded so that it is dependent on the host signal by using some attributes of the host signal to create the encoded reference signal. For example, a hash of attributes of the host media signal may be used as a key to encode the reference signal in the encoded domain. The hash is preferably robust to manipulation of the host signal, including changes due to embedding the digital watermark, so that it can be derived from the watermarked signal and used to decode the embedded watermark. Examples of hashes include most significant bits of image samples, low frequency components (e.g., low frequency coefficients, a low pass filtered, sub sampled and/or compressed version of the host signal or signal attributes).

The following describes a digital watermark embedder and detector for images. First, the embedder creates the reference signal in the encoded domain. The encoded domain is a transform domain of the host image. In this particular example, the relationship between the spatial domain of the host image and the encoded domain is as follows. To get from the image to the encoded domain, the image is transformed to a first domain, and then the first domain data is transformed into the encoded domain.

The embedder starts with a reference signal with coefficients of a desired magnitude in the encoded domain. These coefficients initially have zero phase. Next, the embedder transforms the signal from the encoded domain to the first transform domain to recreate the magnitudes in the first transform domain.

The selected coefficients may act as carriers of a multi-bit message. For example, in one implementation, the multi-bit message is selected from a symbol alphabet comprised of a fixed number of coefficients (e.g., 64) in the encoded domain. The embedder takes a desired message, performs error correction coding, and optional spreading over a PN sequence to produce a spread binary signal, where each element maps to 1 of the 64 coefficients. The spreading may include taking the XOR of the error correction encoded message with a PN sequence such that the resulting spread signal has roughly the same elements of value 1 as those having a value of 0. If an element in the spread signal is a binary 1, the embedder creates a peak at the corresponding coefficient location in the encoded domain. Otherwise, the embedder makes no peak at the corresponding coefficient location. Some of the coefficients may always be set to a binary 1 to assist in detecting the reference signal.

Next, the embedder assigns a pseudorandom phase to the magnitudes of the coefficients of the reference signal in the first transform domain. The phase of each coefficient can be generated by using a key number as a seed to a pseudorandom number generator, which in turn produces a phase value. Alternatively, the pseudorandom phase values may be computed by modulating a PN sequence with an N-bit binary message.

Now, the embedder has defined the magnitude and phase of the reference signal in the first transform domain. It then transforms the reference signal from the first domain to the perceptual domain, which for images, is the spatial domain. Finally, the embedder adds the reference signal to the host image. Preferably, the embedder applies a gain factor to the reference signal that scales the reference signal to take advantage of data hiding characteristics of the host image. For examples of such gain calculations see the patent documents incorporated by reference above.

In one implementation, the first transform domain is a 2D Fourier domain computed by taking an FFT of a block of the host image. The encoded domain is computed by performing a 2D transform of the first transform domain. To create the reference signal, the magnitude of the coefficients of the encoded domain are set to desired levels. These coefficients have zero phase. This signal is then re-created in the first domain by taking the inverse FFT of the reference signal in the encoded domain. Next, the embedder sets the phase of the signal in the first domain by generating a PN sequence and mapping elements of the PN sequence to coefficient locations in the first domain. Finally, the embedder computes the inverse FFT of the signal, including its magnitude components and phase components, to get the spatial domain version of the reference signal. This spatial domain signal is scaled and then added to the host signal in the spatial domain. This process is repeated for contiguous blocks in the host image signal, such that the embedded signal is replicated across the image.

The host image and reference signal may be added in the first transform domain and then inversely transformed using in inverse FFT to the spatial domain.

The embedder may use a key to specify the magnitudes of the coefficients in the encoded domain and to generate the random phase information of the reference signal in the first transform domain. The locations and values of the coefficients of the reference signal in the encoded domain may be derived from the host image, such as by taking a hash of the host image. Also, a hash of the host image may be used to compute a key number for a pseudorandom number generator that generates the pseudorandom phase of the reference signal in the first transform domain.

The above embedding technique may be combined with other digital watermarking methods to encode auxiliary data. In this case, the reference signal is used to correct for geometric distortion. Once the geometric distortion is compensated for using the reference signal, then a message decoding technique compatible with the encoder extracts the message data. This auxiliary data may be hidden using the techniques described in the patent documents reference above or other known techniques described in digital watermarking literature.

Figure 2:
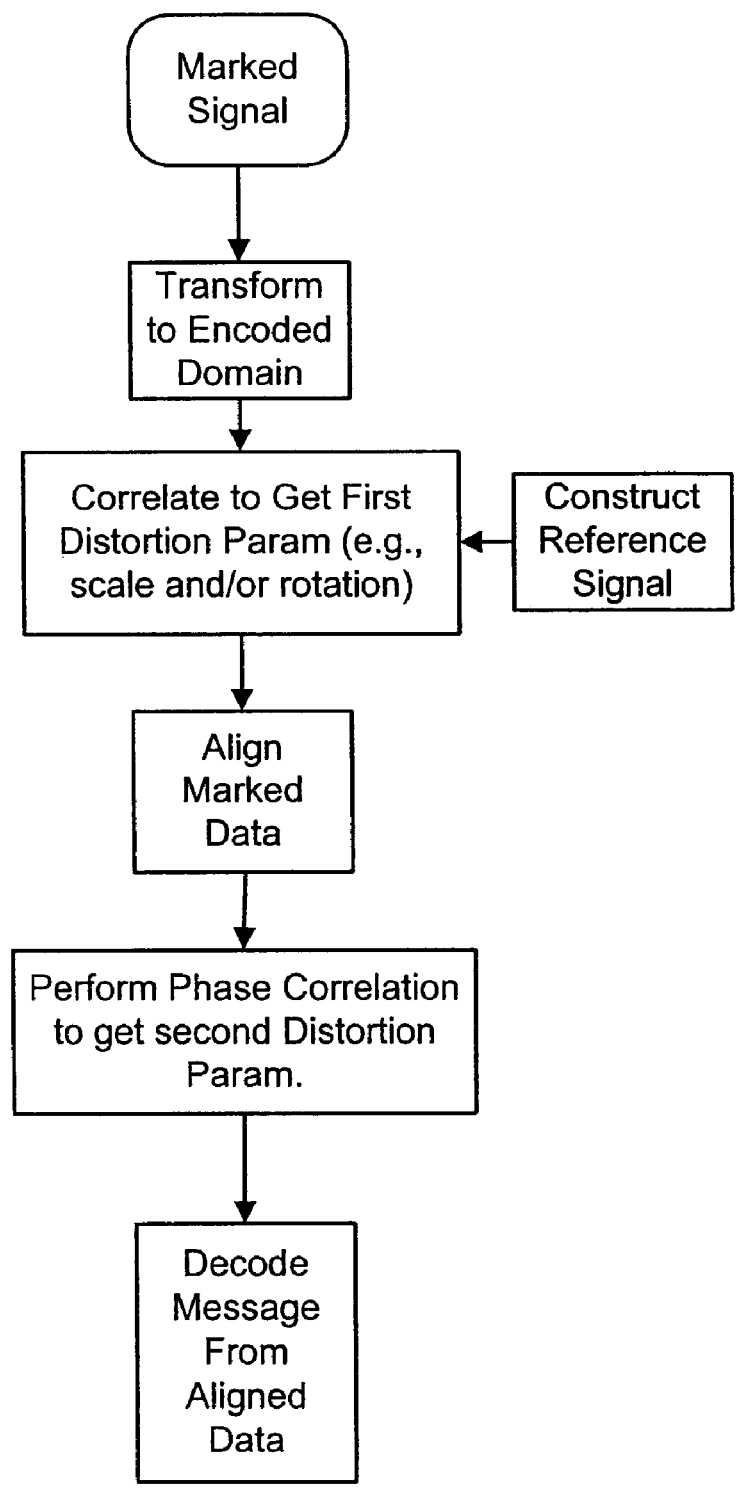
FIG. 2 is a diagram illustrating a digital watermark detector compatible with the embedder of FIG. 1.

FIG. 2 is a diagram illustrating a digital watermark detector compatible with the embedder of FIG. 1.

The detector operates on portions of a signal suspected of containing a digital watermark that has been embedded as described above. First, it creates a specification of the magnitudes of the reference signal in the encoded domain. If the magnitudes were specified by a key, the detector first reads the key or derives it from the watermarked signal. It then constructs a copy of the magnitudes of the reference signal in the encoded domain and uses it to align the watermarked image. If the magnitudes were specified by encoding an N bit message in selected ones of the 64 coefficients, then a proxy for the reference signal is created as a series of peaks at all 64 locations.

To align the watermarked image, the detector transforms the image into the first transform domain and sets the phase to zero. It then transforms the magnitudes of the watermarked image in the first domain into the encoded domain. In the encoded domain, the detector correlates the copy of the reference signal constructed from the key or N bit message with the magnitude data of the watermarked image transformed from the first domain.

The detector may use any of a variety of correlation techniques, such as matched filtering or impulse filtering, to determine affined transformation parameters (e.g., rotation, scale, differential scale, shear), except translation, based on the magnitude data in the encoded domain. Examples of some correlation techniques are provided in the patent documents referenced above. One technique is to transform the magnitude information of the reference signal and watermarked image data to a log polar space using a Fourier Mellin transform and use a generalized match filter to determine the location of the correlation peak. This peak location provides an estimate of rotation and scale.

After finding the rotation and scale, the detector aligns the watermarked image data and then correlates the phase of the aligned watermarked image with the phase of the reference signal. The detector may correlate the watermarked image data with the pseudorandom carrier signal used to create the random phase, or the random phase specification itself. In the case where the pseudorandom phase of the reference signal is created by modulating a message with a pseudorandom carrier, a part of the message may remain constant for all message payloads so that the constant part can be used to provide accurate translation parameters by phase matching the reference phase with the phase of the aligned watermarked image.

Once the watermarked image is aligned using the above techniques, message data may be decoded from the watermarked image using a message decoding scheme compatible with the embedder. In the particular case where an N bit message is encoded into the magnitude of the reference signal in the encoded domain, the message decoder analyzes the 64 coefficient locations of the watermarked data in the encoded domain and assigns them to a binary value of 1 or 0 depending on whether a peak is detected at the corresponding locations. Then, the decoder performs spread spectrum demodulation and error correction decoding (e.g., using a technique compatible with the embedder such as BCH, convolution, or turbo coding) to recover the original N bit binary message.

In the particular case where the N bit message is encoded into the pseudorandom phase information of the reference signal, the decoder correlates the phase information of the watermarked signal with the PN carrier signal to get estimates of the error correction encoded bit values. It then performs error correction decoding to recover the N bit message payload.

The same technique may be adapted for audio signals, where the first domain is a time frequency spectrogram of the audio signal, and the encoded domain is an invertible transform domain (e.g., 2D FFT of the spectrogram).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
   obtaining a media signal;
   computing a reduced-bit representation of the media signal;
   influencing a digital watermark embedding process with the reduced-bit representation of the media signal; and
   embedding a digital watermark in the media signal with the influenced digital watermark embedding process, wherein said act of embedding embeds at least a reference signal in the media signal that is used to correct or compensate for geometric distortion, wherein the reduced-bit number seeds a pseudorandom number generator used to generate the reference signal.

2. A method comprising:
   obtaining a media signal;
   computing a reduced-bit representation of the media signal;
   influencing a digital watermark embedding process with the reduced-bit representation of the media signal; and
   embedding a digital watermark in the media signal with the influenced digital watermark embedding process, wherein the watermark embedding process embeds at least one digital watermark component in a transform domain that is dependent on the reduced-bit representation.

3. A method comprising:
   obtaining a media signal;
   computing a reduced-bit representation of the media signal;
   influencing a digital watermark embedding process with the reduced-bit representation of the media signal; and
   embedding a digital watermark in the media signal with the influenced digital watermark embedding process, wherein the reduced-bit representation is used to generate a watermark embedding key associated with a transform domain.

4. A method comprising:
   receiving a media signal comprising a digital watermark hidden therein;
   computing a reduced-bit representation of the media signal;
   influencing detection of a digital watermark detector with the reduced-bit representation of the media signal; and
   analyzing the media signal to detect the digital watermark hidden therein with the influenced digital watermark detector, wherein the digital watermark comprises at least one component that is detectable in a transform domain, and wherein the transform domain is associated with the reduced-bit representation.

5. A method comprising:
   receiving a media signal comprising a digital watermark hidden therein;
   computing a reduced-bit representation of the media signal;
   influencing detection of a digital watermark detector with the reduced-bit representation of the media signal; and
   analyzing the media signal to detect the digital watermark hidden therein with the influenced digital watermark detector, wherein the reduced-bit representation is used to calculate a detection key used by the digital watermark detector to detect the digital watermark.

6. A method comprising:
   receiving a media signal comprising a digital watermark hidden therein;
   computing a reduced-bit representation of the media signal;
   influencing detection of a digital watermark detector with the reduced-bit representation of the media signal; and
   analyzing the media signal to detect the digital watermark hidden therein with the influenced digital watermark detector, wherein the reduced-bit representation seeds a pseudorandom number generator used at least in part in detecting the digital watermark.

7. A method comprising:
   receiving a media signal comprising a digital watermark hidden therein;
   computing a reduced-bit representation of the media signal;
   influencing detection of a digital watermark detector with the reduced-bit representation of the media signal; and
   analyzing the media signal to detect the digital watermark hidden therein with the influenced digital watermark detector, wherein the act of influencing detection of a digital watermark detector with the reduced-bit representation of the media signal comprises at least an act of utilizing a transform domain that is associated with the reduced-bit representation of the media signal.

8. A method of detecting a digital watermark comprising:
   receiving a host signal carrying a digital watermark;
   computing attributes of the host signal;
   using the attributes of the host signal to compute a key; and
   using the key to detect the digital watermark in a transform domain dependent on the key.

9. The method of claim 8 wherein the host signal comprises at least one of audio, video or imagery.

10. The method of claim 8 wherein the digital watermark comprises at least a reference signal that is used to correct or compensate for geometric distortion.

11. The method of claim 8 wherein the attributes seed a pseudo-random number generator used to compute the key.

12. A method comprising:
   obtaining an audio or video signal;
   computing a value from the audio or video signal;
   influencing a digital watermark embedding process with the value from the audio or video signal, where the value influences magnitudes of at least some coefficients associated with the audio or video signal in a transform domain; and
   embedding a digital watermark in the audio or video signal with the influenced digital watermark embedding process.

13. The method of claim 12 where the value comprises a hash.

14. The method of claim 12 where the value influences a phase of at least some coefficients associated with the audio or video signal in a transform domain.

15. A method comprising:
receiving an audio or video signal comprising a digital watermark hidden therein;
computing a value of the audio or video signal;
influencing detection of a digital watermark detector with the value where the value specifies magnitudes of at least some coefficients associated with the digital watermark; and
analyzing the audio or video signal to detect the digital watermark hidden therein with the influenced digital watermark detector.

16. The method of claim 15 where the value comprises a hash.

* * * * *